United States Patent [19]

Chisum

[11] Patent Number: 4,527,981
[45] Date of Patent: Jul. 9, 1985

[54] METHOD AND APPARATUS FOR DESIGNING A LOG HOME

[76] Inventor: Finis L. Chisum, Box 1145, Claremore, Okla. 74017

[21] Appl. No.: 122,111

[22] Filed: Feb. 19, 1980

Related U.S. Application Data

[63] Continuation of Ser. No. 906,060, May 15, 1978, abandoned.

[51] Int. Cl.³ .............................................. G09B 25/04
[52] U.S. Cl. ...................................... 434/72; 446/106
[58] Field of Search ..................... 35/7 R, 16; 46/20

[56] References Cited

U.S. PATENT DOCUMENTS

| | | | |
|---|---|---|---|
| 2,559,261 | 7/1951 | Schwartz | 35/16 |
| 2,958,142 | 11/1960 | Kershaw | 35/16 |
| 3,728,190 | 4/1973 | Clay | 35/16 UX |
| 4,135,315 | 1/1979 | McKee | 35/16 |

FOREIGN PATENT DOCUMENTS 7420230  1/1976  France ................................. 35/16

OTHER PUBLICATIONS

Abstract page and p. 1 of U.S. Pat. No. 3,646,690.

*Primary Examiner*—Harland S. Skogquist
*Attorney, Agent, or Firm*—Head, Johnson & Stevenson

[57] ABSTRACT

In the process of designing a log structure, a kit is provided having a plurality of model logs of different diameters and lengths, having saddle notches and/or end notches, panels for windows, doors, etc., ceiling panels, trusses, and so on. A construction board or surface is provided having a rectangular grid of squares laid out to the same scale as the logs and other elements. In designing the structure, the various model building elements are laid out on the construction surface in precisely the same manner that they would be assembled on a floor slab with the full-sized finished logs. Model elements of the precise lengths, etc. are used, so that wall openings, such as windows and doors would be positioned precisely at the desired location. Sufficient numbers of elements would be provided to build a complete structure. Each construction element would be identified by a coded alpha-numeric symbol or designation which would completely specify the construction of that element. These code designations would plainly be marked on the element. When the structure is completed, photographs are taken of each wall and floor plan, so that the detailed construction of the structure is clearly shown. A complete bill of materials would then be available by listing each of the elements in the structure. The photographs would serve as assembly instructions since they would indicate the precise position and identification of each of the elements.

1 Claim, 3 Drawing Figures

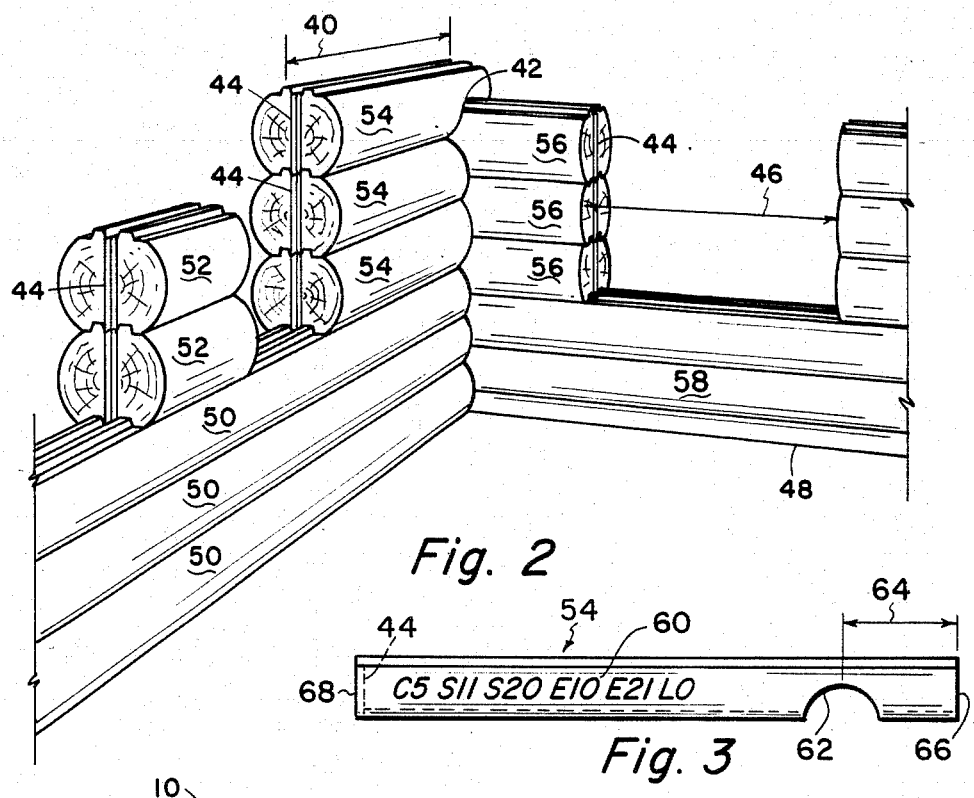
Fig. 2
Fig. 3
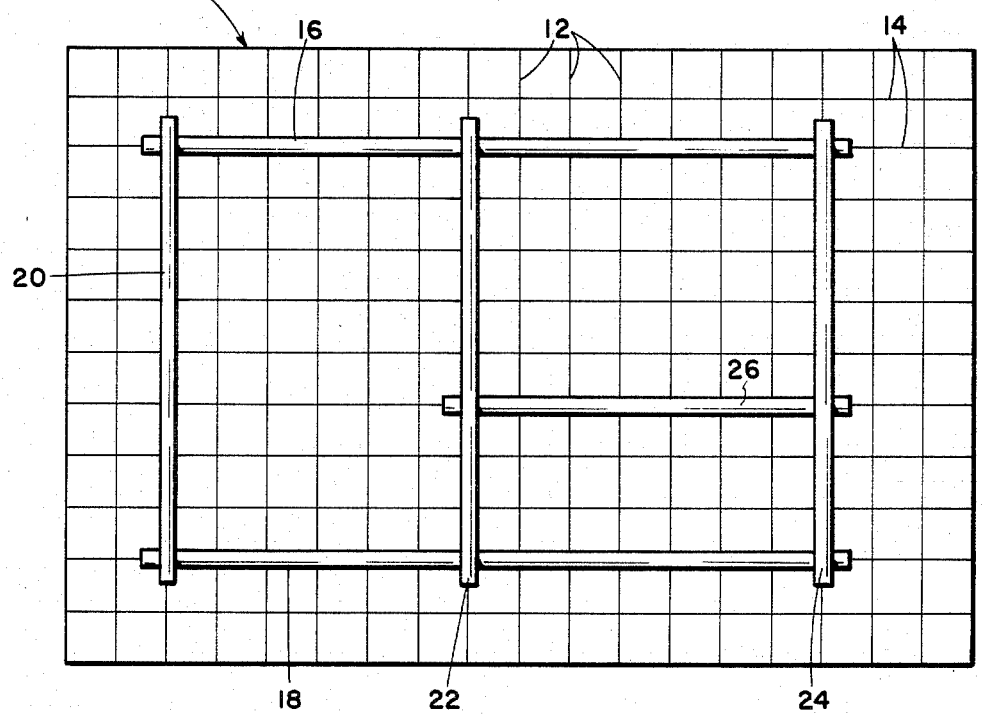
Fig. 1

METHOD AND APPARATUS FOR DESIGNING A LOG HOME

This application is a continuation of application Ser. No. 5/906,060 filed May 15, 1978 and now abandoned.

CROSS-REFERENCE TO RELATED PATENTS

This invention is related to U.S. Pat. No. 3,951,187 by the same inventor entitled "Machine to Prepare Logs for Log Houses, and U.S. Pat. No. 4,047,350 by the same inventor, entitled, "Log Product". U.S. Pat. Nos. 3,951,187 and 4,047,350 are both entered by reference into this application.

BACKGROUND OF THE INVENTION

1. Field of the Invention

This invention lies in the field of construction of buildings for living and business purposes. More particularly, it concerns a process by which such buildings can be designed by persons unskilled in the use of architectural design procedures.

Still more particularly, this invention involves apparatus and method for designing a structure by utilizing precise scale model building elements, and assembling the model elements on a scaled construction surface, until the structure includes all necessary design features and all building elements that will be utilized in the final structure. The list of model elements in the model assembly provides a bill of materials or mill order, for the construction of that structure. Photographs of the model can serve as building assembly instructions, utilizing full scale elements manufactured to the specification of the model elements.

2. Description of the Prior Art

In the prior art, buildings such as homes and officer have always been designed by means of pencil drawings on paper. In most cases these designs have been made by professional artists or architects who understand the types of projection or views of three-dimensional structures, that are shown on two-dimensional displays.

Unfortunately, most home buyers are unskilled in the use of two-dimensioned displays of three-dimensional objects, and find it difficult to visualize a three-dimensional object when described in two-dimensional views. Thus, it is almost impossible for a prospective home buyer or builder to design his own home without the help of a professional artist or architect, who can take verbal instructions, and place them on paper in the form of two-dimensional displays. Even so, the prospective buyer is often unable to fully benefit from the displays unless he can visualize the three-dimensional nature of the final design.

In the use of new types of building materials, such as cylindrical logs, for example, for the construction of homes and buildings, it is even more difficult for an unskilled person to visualize the appearance of a finished building which utilizes logs rather than board lumber.

SUMMARY OF THE INVENTION

It is a primary object of this invention to provide an apparatus and method by which a person unskilled in making architectural plans can assemble a model structure, utilizing model building elements, precisely scaled to the full sized building elements which would be used in building the structure.

It is a further object of this invention to provide a code designation on each construction element so that a photograph of the model structure will provide information from which a bill of material can be compiled.

It is a still further object of this invention to provide photographs of the model structure, which photographs can be used as instructions for assembling the full scale structure.

By assembling these model structural elements, a structure can be designed, laid out on a construction surface, which is also scaled to the ratio of the full-sized building elements to the model elements.

In this way, an unskilled person can assemble foundation, walls, ceiling, and roof in a model structure, which provides him with a clear and understandable picture of what the final structure would look like, since the model is a precise scale facsimile of the finished structure. Furthermore, the method includes an additional step of photographing the structure in various stages of assembly from various points of view so that all details of the assembly can be recorded.

Each of the model elements is identified by an alphanumeric code designation of letters and numbers, which precisely identify that element, and which can serve as a mill order to the manufacturer of the housing elements, to construct a full-scale duplicate of each model element.

By taking photographs of all walls, floors, etc., the code designations on each of the elements will be recorded in the photographs, and subsequently, examination of the photographs make it possible to read off the code designations for each of the elements in the building. The list of these elements will provide a full bill of materials for the manufacturer, so that he can prefabricate each of the elements that will be needed to build the full-scale structure.

It is possible also to disassemble the finished model and to sort out each of the separate construction elements so that like elements are piled together, and thus a complete bill of materials can be written for each of the code designations. This list of elements comprises a full bill of material for the complete structure.

Likewise, the photographs which have been taken, and which include the code designations for each element, will provide a set of instructions for the assembly of the full scale building elements when they have been delivered to the construction site.

BRIEF DESCRIPTION OF THE DRAWINGS

These and other objects and advantages of this invention and a better understanding of the principles and details of the invention will be evident from the following description taken in conjunction with the appended drawings, in which:

FIG. 1 illustrates in plan view the construction board and grid with a sample layout of construction elements in the form of a three-room structure.

FIG. 2 illustrates a sample construction of one corner of a room with the two walls, having openings for windows, etc.

FIG. 3 illustrates a sample model element with code designations.

DESCRIPTION OF THE PREFERRED EMBODIMENT

While this method of design for a building structure can be applied to any type of structure in which prefabricated housing elements are manufactured, delivered to a building site, and then assembled, it will for convenience of illustration and not by way of limitation, be described in terms of a log structure.

In a log structure the principal building elements of which the structure is assembled are logs, which have been prepared of a selected diameter and a selected length, etc.

The logs themselves can be saddle notched at one or both ends, or at neither end. A complete specification of the log requires the precise position of the saddle notch from one or both ends.

The logs are also end notched on one or both ends, where they are joined end-to-end with other logs, or when they abut window frames and/or door frames. Furthermore, the logs may be slit longitudinally for various purposes so that this information, such as whether the log is slit or not, and the angle of the saw cut must be indicated in the code designation or code number.

There are many ways in which a code number can be designed, and one way will be discussed, as an example, though without limitations. So far as log diameter goes, it has been found convenient in construction of log structures to settle on a few standard sizes such as 6", 8", 10" and 12" diameters, and each of these can be represented by a letter such as A for 6", B for 8", C for 10", and D for 12". Thus, the first character in the code would be a letter, either A,B,C, or D, which would indicate the log diameter.

The next portion of the code would be a number representing the length in feet and perhaps tenths, such as 11.5 or 12.0, representing 11½ or 12 feet for the length.

Saddle notching is very important in the corner construction, to provide a tight joint between the logs and to support the walls. A given log can be provided without any saddle notch, or a saddle notch at a first end or a second end. Furthermore, the saddle notch can be provided at any selected distance from the end of the log. Thus, S10 might represent a log with the first end without a saddle notch. S11 would be a log with a saddle notch at the first end spaced one foot away from the end, and S21 would be a log with a saddle notch at the second end, one foot from the end, and so on.

The end notch is provided to hold window frames and door frames and to join butt ends of two logs together. If there is a saddle notch at one end, then an end notch will not generally be required, although this is not necesarily so. An end notch at the first end might be indicated by E11 or at the second end by E21, a log without end notches would be indicated by E10, E20.

Finally, the question of whether the log is slit or not must be shown. A log which is slit halfway between top and bottom, that is, with an angle of cut of 0° to the horizontal, would be used to provide a half log along one wall to match the presence of a full log at an intersecting corner, and similarly, the other half would be used on the top of the second wall. Such a slit log might be indicated as L0 for no slit, L10 for a slit at angle 0° to the horizontal, and L145, for example, to show a slit at 45° to the horizontal, and so on.

Thus, the following code designation would provide positive and complete information about the log in relation to the five particulars previously discussed. Such a log would be identified as A12 S10 S21 E11 E20 L0. This would be a six-inch diameter log, 12 feet long, with a saddle notch only at the second end, one foot from the end, and an end notch only at the first end, and the log is not slit.

Corresponding codes for panels representative of windows, for example, and for ceiling panels, and for trusses, can, of course, be designed so that in the photograph, and on the element, the code designation can be read to provide the bill of materials for the structure.

Referring now to FIG. 1, there is indicated generally by the numeral 10 a horizontal board with a grid of rectangular, equally spaced lines, representing dimensions to the scale of the logs with respect to the finished structural elements. For example, the scale might be one inch on the model equals a foot on the full scale elements, or some different selected ratio. Thus, at the scale of 1" equal to 1', a 5-foot board would hold a model structure which would be 60 feet long, in full-size construction. The grid lines would facilitate the layout and assembly of the various parts which could be held in place by magnetic means, for example, or by adhesive means. It will be clear that the model can be assembled on a plane surface without grid. However, in the photographs, the grid provides full dimensional information.

Shown in FIG. 1 is a plan view of a structure comprising two long walls 16 and 18 arrayed parallel to the longitudinal grid lines 14 and three short walls 20, 22 and 24 arrayed parallel to the transverse lines 12 of the grid. A third short wall 26 joins the two walls 22 and 24.

No detail of these walls is shown other than that the ends of the logs are all saddle notched so as to provide cross-corners.

FIG. 2 is based on FIG. 2 of applicant's Pat. No. 3,951,187, which illustrates a corner construction of a log structure. In the corner, each of the logs 54 and 56 are saddle notched at some selected distance from the end. Logs 54 and 56 will be saddle notched at one end and will be end notched 44 at the other end.

The logs 52 will be end notched at both ends since these short logs fill the space between two window frames, and so on.

The length of the logs would be indicated by the dimensions 40, for example, and for the space of a window panel by the dimension 46, for example.

The log portion 48 is constructed by slitting a log horizontally at the mid-point between the top and bottom surfaces. This serves to fill the space between log 58 and the floor so that they will match properly the logs 50.

FIG. 3 indicates a sample model log element such as 54 of FIG. 2. The code designation 60 for this log element is shown as C5 S11 S20 E10 E21 L0. This designates a log 5 foot long of 10" diameter, having a saddle notch 62 only on the first end 66, at a distance 64 from the end, of 1 foot. The log has an end notch 44 only on the second end 68. The log is not slit longitudinally. The code designation 60 would be placed on both sides (front and back, inside and outside) of the log 54 so that the code would be recorded in all photographs showing the wall that contained that particular log.

Also, while the model is assembled on the construction surface 10, it is possible to mark on the structural surfaces of the model walls, floors and ceilings, the routes of service lines such as water pipes, gas pipes, electrical lines, and so on. This provides a record, to scale, in the photographs, of the location of all service lines, and forms the basis for a material list.

No great detail has been described for the model elements of the building elements, since these can be encompass any type of construction material that might be used for building structures.

The object of this invention is to provide a plurality of building elements which are precise scale models of the full-scale building elements, so that a prospective buyer or builder can assemble a structure using the model elements, and can utilize standard furniture elements, which are also constructed to the same scale as the building elements, and he can then actually arrange furniture and internal structure to suit his needs in relation to doors and windows, etc. Thus, he can fully visualize the structure that would be constructed, based upon the model which he has assembled. Having assembled the model to his own satisfaction, he can then photograph it or otherwise make a copy of it, to provide a record of the precise detailed construction, and to provide the basis for assembling a true bill of material for the manufacture of the prefabricated building elements. The step of copying or photographing can be done at intermediate stages of assembly, or completion of construction. Thus, a set of photographs can be made at the time that the walls are completed. Additional photographs can be made after the ceiling panels are in place, showing the beams, etc. Another set can be made after the roof trusses are in place, and a final set after the roof is complete, for example.

While the invention has been described in relation to buildings constructed of cylindrical logs, this is only by way of example, and not by way of limitation, since model building elements of any type can be used in the method of this invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for designing a scale model of given full scale log home or building design comprising:
    (a) a plurality of scale model building logs at least sufficient in number to construct said design, each representative of commercially available logs, constructed with selected values of diameter and length, with selected added features of slots, notches, cutouts, and made to a selected scale S;
    (b) each model log being prominently marked with a characteristic code designation as to its length, diameter, slots, notches, cutouts, by which it and said full scale counterpart can be fully specified in a bill of materials for manufacture; and
    (c) a selected surface on which said model logs can be assembled into a selected structure, said surface having a rectangular grid drawn to said selected scale S.

* * * * *